United States Patent [19]

Enniss et al.

[11] Patent Number: 5,046,759
[45] Date of Patent: Sep. 10, 1991

[54] BRAIDED FABRIC STRUCTURE FOR SEAMLESS FABRIC CONFINEMENTS

[75] Inventors: James P. Enniss, Granger, Ind.; Delbert A. Davis, Mishawaka, both of Ind.

[73] Assignee: Uniroyal Plastics Co., Inc., Mishawaka, Ind.

[21] Appl. No.: 335,001

[22] Filed: Apr. 7, 1989

[51] Int. Cl.⁵ .................... B60R 21/16; D03D 15/08; D04B 39/00
[52] U.S. Cl. .................................... 280/743; 156/147; 264/292; 264/314
[58] Field of Search ............... 280/728, 731, 734, 743; 264/292, 257, 231, 314; 156/147

[56] References Cited

U.S. PATENT DOCUMENTS

| | | | |
|---|---|---|---|
| 1,701,472 | 2/1929 | Dinsmore | 264/291 |
| 2,430,931 | 11/1947 | Hershberger | 154/43.5 |
| 2,550,894 | 5/1951 | Weisbecker | 18/56 |
| 2,700,181 | 1/1955 | Wilson | 18/45 |
| 2,751,953 | 6/1956 | Grimm | 150/0.5 |
| 2,886,853 | 5/1959 | Herman et al. | 18/55 |
| 3,040,383 | 6/1962 | Nassimbene | 156/222 |
| 3,135,640 | 6/1964 | Kepka | 156/147 |
| 3,138,507 | 6/1964 | Wiltshire | 156/194 |
| 3,316,337 | 4/1967 | North | 264/231 |
| 3,356,446 | 12/1967 | Cooper | 8/131 |
| 3,445,055 | 5/1969 | Port et al. | 229/53 |
| 3,451,693 | 6/1969 | Carey | 280/150 |
| 3,453,164 | 7/1969 | Gursky et al. | 156/198 |
| 3,490,973 | 1/1970 | Graff et al. | 156/156 |
| 3,497,587 | 2/1970 | Ikeda et al. | 264/255 |
| 3,554,368 | 1/1971 | Nagel | 206/46 |
| 3,567,536 | 3/1971 | Wickersham, Jr. | 156/78 |
| 3,576,703 | 4/1971 | Baker et al. | 156/221 |
| 3,705,645 | 12/1972 | Konen | 206/46 R |
| 3,713,936 | 1/1973 | Ramsey, Jr. | 264/134 |
| 3,723,234 | 3/1973 | MacDonald | 161/89 |
| 3,730,551 | 5/1973 | Sack et al. | 280/743 |
| 3,761,111 | 9/1973 | Kemper | 280/150 AB |
| 3,792,873 | 2/1974 | Buchner et al. | 280/150 AB |
| 3,797,855 | 3/1974 | Wright, Jr. | 280/743 |
| 3,807,754 | 4/1974 | Rodenbach et al. | 280/150 AB |
| 3,810,654 | 5/1974 | Debano, Jr. et al. | 280/150 AB |
| 3,814,658 | 6/1974 | Decker | 161/77 |
| 3,819,638 | 6/1974 | Ogawa et al. | 264/292 |
| 3,888,504 | 6/1975 | Bonn et al. | 280/150 AB |
| 3,892,425 | 7/1975 | Sakairi et al. | 280/150 AB |
| 3,937,488 | 2/1976 | Wilson et al. | 280/150 AB |
| 3,951,190 | 4/1976 | Suter | 150/0.5 |
| 3,989,789 | 6/1962 | Brookhart | 264/136 |
| 4,006,918 | 2/1977 | MacFarland | 280/729 |
| 4,097,065 | 6/1978 | Okada et al. | 280/743 |
| 4,146,667 | 3/1979 | Stannard | 428/262 |
| 4,169,613 | 10/1979 | Barnett | 280/743 |
| 4,196,534 | 4/1980 | Shibamoto | 40/10 R |
| 4,213,634 | 7/1980 | Hoshino et al. | 280/728 |
| 4,215,171 | 7/1980 | Marco et al. | 428/245 |
| 4,253,507 | 3/1981 | Williamson | 150/1 |
| 4,262,931 | 4/1981 | Strasser et al. | 280/729 |
| 4,360,124 | 11/1982 | Knaus et al. | 220/452 |
| 4,446,092 | 5/1984 | Bliley | 264/258 |
| 4,508,294 | 4/1985 | Lorch | 244/122 AG |
| 4,805,930 | 2/1989 | Takada | 280/739 |
| 4,808,362 | 2/1989 | Freeman | 264/257 |
| 4,921,735 | 5/1990 | Bloch | 280/743 |

FOREIGN PATENT DOCUMENTS

| | | |
|---|---|---|
| 54-000076 | 1/1979 | Japan. |
| 54-122367 | 9/1979 | Japan. |
| 56105954 | 1/1980 | Japan. |
| 2156394 | 10/1985 | United Kingdom. |

*Primary Examiner*—Richard A. Bertsch
*Attorney, Agent, or Firm*—Pennie & Edmonds

[57] ABSTRACT

An air bag restraint system for protecting vehicle occupants during a collision comprising a seamless inflatable confinement of braided fabric constructed by strands of multiple fibers which are interlocked by diagonally crossing a number of these strands alternately over and under one or more of the other strands. The seamless air bag is formed by braiding textile yarns to a mold having the shape of the desired confinement. An elastomer coating may be applied to render the braided fabric either essentially non-porous and non-permeable to air or semi-permeable to control air flow. Also, methods for manufacturing such seamless braided fabric confinements.

32 Claims, 1 Drawing Sheet

BRAIDED FABRIC STRUCTURE FOR SEAMLESS FABRIC CONFINEMENTS

FIELD OF THE INVENTION

The present invention relates generally to the formation of fabric confinements and more particularly to the formation of a braided fabric air restraint bag.

BACKGROUND OF THE INVENTION

Much attention has recently been directed to the formation of fabric confinements requiring special characteristics. For example, the automobile industry has become increasingly concerned with safety of automobile occupants during a crash. It is known to construct a confinement, referred to as an "air bag" in an automobile which is inflated upon detection of a crash. Today, many automobile manufacturers have met consumer concern for safety through the inclusion of air bags in motor vehicles not only as optional equipment but also as standard equipment.

However, manufacturers have encountered difficulty and expense in the formation and production of air bags of specified shapes and dimensions.

A typical air restraint system presently utilized in passenger motor vehicles includes an inflatable confinement, or air bag, an impact detector and an inflating means. Upon detection of an impact greater in magnitude than a threshold impact, the impact detector provides a signal to the inflating means which causes the inflating means to inflate the confinement. The inflating means illustratively comprises pyrotechnic or gas producing means. Thus, the inflated confinement serves to protect the passenger and/or driver from what is often considered the most serious effect of an automobile collision: a secondary collision, i.e., the collision between an occupant and the interior of the motor vehicle.

Unfortunately, any such air restraint system is effective in preventing personal injury only to the extent that the occupant properly contacts the inflated bag. Thus, the dimensions and shape of an inflated air bag are critical and are often dictated by an exacting specification.

The specific shape and dimensions of any particular air bag are affected by the position in which it is placed in a motor vehicle. Consideration must be given to not only the position of the protected occupant(s) but also to the portion of the vehicle's interior in close proximity to the air bag and against which the air bag will be forced in a collision. Such design considerations, among others, have led to uniquely shaped air bags. For example, U.S. Pat. No. 4,262,931 to Strasser et al. discloses an air bag having a plurality of compartments for knee, torso and head restraint, some of which deploy towards one of the passenger seating positions and some of which expand laterally across the vehicle interior in front of the adjacent passenger position. This particular device also utilizes a pressure regulating valve flap between compartments. U.S. Pat. No. 3,937,488 to Wilson et al. depicts an elongated air bag of approximately rectangular cross-section and planar end sections. This particular device utilizes two different materials of different air permeability to form the air bag.

Some known devices have attempted to solve problems associated with providing air bags of precise shapes and dimensions through stitching together separate sheets of fabric so as to form a desired shape. Unfortunately, stitched seams in known air bags have encountered difficulty in maintaining the pressure within the bag during inflation. Air bags, in order to be effective, must inflate within a fraction of a second. Such a rapid rate of inflation and ultimate pressure leads to the exertion of a tremendous tensile load on the stitching. Such stitching decreases the overall strength of the fabric at the seam due to the perforations in the fabric inherent from the stitching process. Additionally, the strength of the stitching thread must be considered, as well as the additional cost of stitching.

Furthermore, stitching of separate sheets of fabric, whether they are identical or of different air permeability, increases the bulk of the air bag, as the seam will have a thickness which is at very least the sum of the thickness of both separate sheets of fabric. With the current practice of downsizing vehicles, any unnecessary bulk is most undesirable. Excess bulk leads to unwanted excess weight which is undesirable in efforts to reduce weight and which in turn makes rapid deployment more difficult. Stitching is also undesirable since it produces a protrusive stitched surface which may harm an occupant whom it contacts. Illustrative of air bags constructed from stitched together layers of fabrics is that disclosed in U.S. Pat. No. 3,892,425 to Sakairi et al.

For the sake of completeness, it has been recognized that air restraint bags which at least partially deflate soon after, or even during, inflation advantageously provide a means to counteract the dangerous effect known as rebound. Such controlled deflation permits the air bag to absorb more energy from the occupant.

Various methods have been proposed for the controlled deflation of air bags. Illustrative of such methods are those disclosed in U.S. Pat. Nos. 3,937,488 to Wilson (air bag constructed from at least two materials having different air permeability values) and U.S. Pat. No. 3,892,425 to Sakairi et al. (air bag constructed from coated material wherein expansion of the air bag stretches the stitches of the fabric, creating new openings through the coating in addition to microporous openings).

Additionally, the exacting specifications to which an air bag manufacturer must adhere to include requirements relating to shape, dimension, energy absorption, inflation and deflation time periods, toxicity, flammability, tensile and tear strength, flexibility from −30° C. to 90° C., temperature and accelerated aging resistance. Unfortunately, the use of fabrics can present difficulty in meeting such requirements.

SUMMARY OF THE INVENTION

This present invention relates to an air bag restraint system for protecting an occupant of a vehicle during a collision comprising an inflatable confinement adapted for attachment to the vehicle and inflatable upon collision of the vehicle. The confinement is constructed from a seamless braided fabric. Such a system also includes means for inflating the confinement with a fluid upon the occurrence of a collision. The inflating means inflates the confinement to a predetermined shape upon a collision, the shape being determined by characteristics of the vehicle interior space and relative position of the passenger. An elastomer coating may be applied to the braided fabric and is preferably cross linked and illustratively ranges in thickness from 0.5 to 10 mils.

The braided fabric is an interlocking multifiber structure having high multiaxial strength and low stretch (typical 10-50% at break). In addition, braided fabric is easily formed into three dimensional shapes of predetermined size and configuration without cutting and sewing together of two dimensional pieces. The fabric strength holds the size and configuration of the shaped confinement and prevents tearing even under the pressures of inflation and impact.

The fabric includes strands of multiple fibers which are interlocked by diagonally crossing a number of strands in such a way that each strand alternates over and under one or more of the other strands. A three dimensional structure is formed by braiding yarns over and around the shape of a mold having the desired final shape. The braiding conforms the yarns to the shape of the mold by the intermeshing of the yarns which locks them into the shape of the mold.

The term "braided fabric" is intended to mean fabric formed of braided fibers or yarns. A fabric produced by braiding has a structure wherein the paths of the yarns are not parallel to the fabric axis. Therefore, braided fabrics do not have warp and filling yarns in the sense of a woven fabric. Instead, only the warps may be considered to intersect as a plain weave (one over one) or a basket (two over two). This configuration provides a fabric which combines good physical properties such as flexibility and high bursting strength at relatively low cost.

In addition, the interlocking strand configuration provides a higher strength than woven fabric having sewn seams. This is so because there is no compromise in the tensile and tear strength of the material which would be created by seams. This in turn allows the braided fabric to utilize smaller yarns. As a result, the bulk of articles using this braided fabric is reduced by both the smaller yarns and the seamless construction which offers a further advantage.

The fabric is preferably braided from a yarn having a filament or spun configuration which suitably enhances the tensile strength and shrinking and/or relaxing of the fabric when exposed to heat.

The fabric provides resistance to tear and may be constructed of a wide variety of materials. Illustrative materials include polyester, nylon, wool, silk, cotton or any other material which may be made to take on a desired shape. The fabric is braided so that it exhibits low stretchability in all directions so as to easily hold a desired size and shape.

Another embodiment of the invention relates to the use of an elastomer coating upon the braided fabric structure. This coating comprises any suitable material which renders the fabric essentially non-porous or semi-permeable. Such material preferably has a sufficiently long shelf life and tends not to become brittle with age or temperature extremes. Additionally, in the event that pyrotechnic means are employed to inflate the confinement, the elastomer must be especially heat resistant to protect the fabric. Illustrative of suitable materials are chloroprene, nitrile, silicone, acrylic, urethane, polyvinyl chloride (PVC), butyl, ethylene propylene diene monomer elastomers (EPDM), or a combination of these and/or other suitable materials. Additionally, coatings disclosed in U.S. Pat. No. 3,807,754 to Rodenbach et al. which is incorporated herein by reference may be employed with the present invention.

The inflatable confinement is preferably provided with means for deflating same which means is operative during and/or after the inflating process so as to prevent rebound of the occupant engaging the confinement. The means for deflating may comprise a plurality of ports through which the fluid flows outward. Alternatively, the means may comprise a braided material having a yarn density or compactness which renders the confinement at least semi-porous.

The inflating means is provided to quickly inflate the confinement during a collision and illustratively is a pressurized fluid or pyrotechnic system. Furthermore, the fluid utilized is preferably a gas.

The present invention also relates to an improved passive air restraint device of the type having an air bag inflatable upon a collision, inflating means to inflate the air bag upon the collision and collision detection means to detect a collision of magnitude at least equal to a threshold magnitude, wherein the improvement comprises a seamless air bag formed from a braided fabric. The fabric optionally may have an elastomer coating thereupon so as to render the fabric essentially non-porous and non-permeable. A coating is not necessary for the formation of the braided structure but may be used to protect the yarns from heat of the deployment reaction and to control passage of the deployment fluid through the textile structure. Advantageously, the seamless air bag is deflatable after being inflatable to a desired shape.

The present invention also relates to a method for manufacturing an inflatable confinement for use in protecting an occupant of a vehicle during a collision, which method comprises providing a mold having an exterior surface forming the desired shape of a fully deployed bag, braiding yarns to the exterior surface of the form and optionally applying an elastomer coating to the fabric.

The step of forming the braided fabric confinement comprises braiding the fabric over an exterior surface of a mold which has been inflated to a predetermined size corresponding to the shape of a fully deployed bag. Thus, the fabric takes on the shape of the exterior surface of the mold. If an elastomer coating is used, it is applied and cured before the mold is deflated so as to facilitate removal of the elastomer-coated braided fabric from the mold.

The present invention also relates to a method of manufacturing an inflatable confinement for use in passive air bag restraint devices which comprises braiding yarns onto an inflatable mold, inflating the mold to a predetermined size having an exterior surface of a desired shape, optionally applying an elastomer coating to the braided fabric in an amount sufficient to render the braided fabric essentially non-porous, curing the elastomer coating if required by heat or other suitable curing mechanism and deflating the inflatable mold so as to facilitate removal of the braided fabric from the mold.

DETAILED DESCRIPTION OF THE INVENTION

The present invention is a method and apparatus for protecting occupants of vehicles during sudden impact by way of an inflatable confinement comprising a braided fabric to which an elastomer coating may be applied, wherein the inflatable confinement is formed by braiding yarns in an interlocking pattern over and around the shape of a mold to form a three dimensional structure, optionally followed by applying a coating, preferably of an elastomer, upon the fabric and curing the elastomer to form a coated fabric article.

Figure 2:
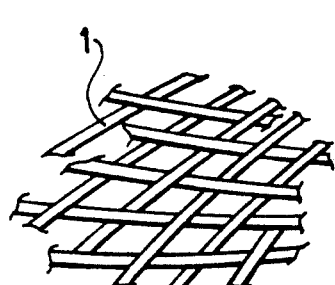
FIG. 2 is an enlarged cross-sectional view of a coated braided yarn material according to the invention.
Figure 1:
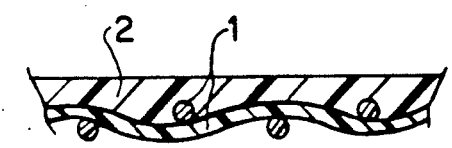
FIG. 1 is an enlarged view of the braided yarn material of the invention.

FIGS. 1 and 2 show the braided fabric structure of the invention, and reveal the interlocking relationship of yarns 1. FIG. 2 further shows the elastomer coating 2 which is applied to the molded structure.

More specifically, a mold is created in the shape of the desired product. The mold may take on a variety of shapes, and may have complex portions such as concave areas. Furthermore, the mold is preferably collapsible, so as to be easily removed from the finished product. Additionally, bladder type inflatable molds may be employed to form products of similar shapes but of different dimensions. Alternatively, molds may be created from plaster of Paris, frangible materials, cardboard, or a wide variety of materials which can easily be made to break, dissolve, disintegrate, melt or the like so as to be separated from the fabric and elastomer. Collapsible type molds such as those incorporating a double-umbrella type structure may also be employed in the present invention. Such a double-umbrella type structure illustratively comprises, in collapsed form, a tubular shaped member which has a number of struts connected by suitable fabric, similar to an umbrella. Upon extension of the struts, an open umbrella configuration is achieved. Advantageously, two such sets of struts are provided in an end to end fashion such that a suitable confinement configuration is created upon expanding the tubular shaped member and extending the struts. In such an embodiment, the yarns are braided over the extended structure to form the confinement which then may be coated with an elastomer and cured. Subsequent to curing, if necessary, the mold is collapsed and the confinement removed.

It is not necessary, however, for a mold to deform, disintegrate, etc., depending on its shape and dimensions and the desired shape and dimensions of the finished product. If removal of the finished product from the mold can be accomplished without tearing the product, and without subjecting the product to undue forces, a rigid mold is suitable for use with the present invention.

At the time of application of the braiding yarns the inflatable mold is in its fully inflated state, i.e., in the shape of the desired end product. The neck, or collar, area of the confinement is produced so as to properly mate with a mechanism used to join the confinement to the pyrotechnic or gas producing means employed to deploy the confinement.

The yarn to be formed over the mold is intended to include all materials suitable for use in making inflatable confinements in accordance with the invention. Illustratively, such yarns may be constructed from cloth, plastic, metal, wool, silk, cotton, filament rayon fiberglass and the like, however, polyester or nylon yarns are preferred. Braided fabrics are preferred over knit fabrics, especially for complex shapes, since braided fabrics have high multiaxial strength and low stretchability, unlike knit fabrics.

A preferred braided fabric is constructed from textile yarn or thread of natural, synthetic or regenerated fiber that has been interlocked into a configuration which provides multiaxial strength and low stretchability. Fabric braided to have stretch of 10–50 percent at break has been found to be suitable for a wide variety of molds.

Fabric may be braided into a wide variety of shapes, without cutting and sewing together individual pieces. This advantageously allows the formation of complex shapes without bulky seams. Seamless construction also provides for a higher fabric strength using smaller yarns since there is no comprise in the tensile and tear strength of the material as created by seams. This further reduces the time and material wasted by tailoring a fabric to a complex shape.

Once the braided fabric is formed over the rigid or collapsible mold an elastomer coating may be applied to the fabric to protect the yarns from heat of the deployment reaction and to control passage of the deployment fluid through the textile structure.

If an elastomer coating is used, a sufficient amount is applied so as to render the braided fabric either essentially non-porous and non-permeable to air or semi-permeable to control air flow under typical operating conditions. Application of the elastomer coating may be effected by any of a number of known means such as spraying the elastomer onto the fabric, dipping the fabric into the elastomer, brushing the elastomer onto the fabric, or slush coating techniques. Additionally, the mold upon which the braided fabric is formed may be rotated as the elastomer is applied.

Any elastomer having suitable properties for the construction of a specific air bag in accordance with design specifications may be employed. Broadly, suitable air bags may be constructed with elastomers such as appropriately compounded chlorinatedrubber, silicone, fluorosilicone, polyvinyl chloride, acrylate, urethane, nitrile, butyl or EPDM. If necessary, permeability of the air bag may be adjusted by adjusting the amount and the areas of deposited elastomer. A range of one-half mil to ten mils has been found suitable for elastomer thickness, with two to seven mils being preferable.

Upon application of the elastomer to the mold-supported fabric, the elastomer is cured by curing methods such as by the application of heat. Additionally, the elastomer may be cured by radiation curing, in which the elastomer is exposed to a prescribed type and dose of radiation. Radiation curing permits the use of short curing times. Aerobic or moisture cure mechanisms may be employed as required by the coating chemistry.

Subsequent to the curing process, the air bag is removed from the mold by an appropriate method. If an inflatable mold was employed, the mold is first deflated and then the air bag is removed. Alternatively, a disintegratable or frangible rigid mold can be utilized in which case the mold is first disentegrated, dissolved, broken, etc. and then the air bag is removed.

Upon removal of the air bag from the mold, the air bag is preferably reversed such that the untreated side of the fabric is exposed so as to conform to typical specifications in the air bag industry.

The cured air bag is preferably provided with means for deflating such that the air bag may absorbed more net energy from the impact of a person. If no such deflating means were provide, the energy absorbed by the air bag from the impact of a person would be momentarily stored in the air bag as potential energy in the form of increased air bag pressure, and then expended in forcing the person away from the air bag with the same violent force with which he impacted the air bag and hence, rebound.

Figure 3:
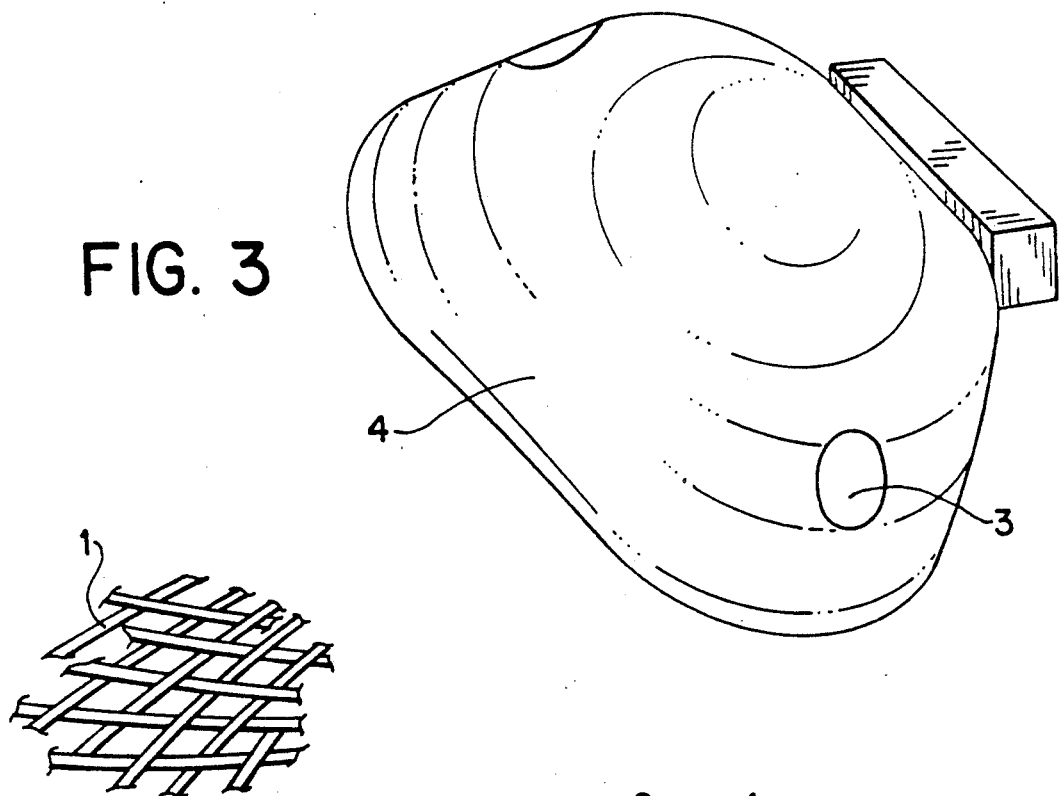
FIG. 3 is a perspective view showing a typical configuration for an air bag according to the present invention, in its fully inflated state.

By providing means for controlling the deflation of the air bag, the energy absorbed by the air bag from the impact of a person is released by the air bag, however, it is not released in a manner harmful to the person. As shown in FIG. 3, for example, the deflating means preferably may be ports 3 in the air bag 4 through which the fluid may escape as the person impacts the air bag.

Any number of such ports as will properly absorb the energy of impact may be provided. Alternatively, a blowout patch or tear strip such as that disclosed in U.S. Pat. No. 3,451,693 to Carey which enlarges as pressure within the air bag increases may be provided.

The deflation means may alternatively include a braided material having a yarn density or compactness which renders the confinement at least semi-porous. Also, portions of the braided fabric structure may remain uncoated to achieve this result. In this embodiment, the spaces or gaps between the interlocking fibers in the uncoated portion would provide means through which fluid escapes during impact of the person.

Figure 4:
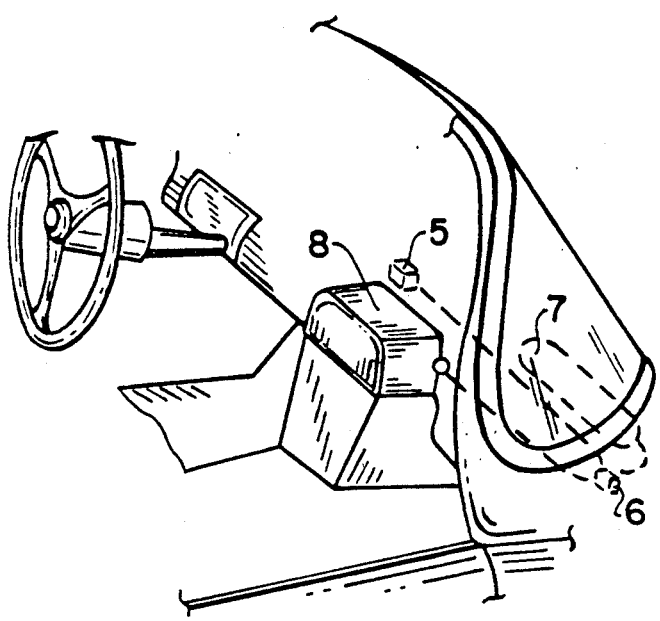
FIG. 4 is a perspective view showing the components of a typical air bag restraint system which utilizes the present invention.

A typical system in which the present invention is used is shown in FIG. 4. Such a system includes an impact detector 5, which upon impact causes valve 6 to open, releasing gas from an inflating means 7. Air bag 4 is stored in compartment 8, and inflates to its protective state upon the release of gas from inflating means 7.

While it is apparent that the invention herein disclosed is well calculated to fulfill the objects above stated it will be appreciated that numerous modifications and embodiments may be devised by those skilled in the art, and its intended that the appended claims cover all such modifications and embodiments as fall within the true spirit and scope of the present invention.

More specifically, the present invention is not limited to use in automobiles. The braided fabric may be used as an inflatable confinement for protecting persons in trains, planes, boats or any other application requiring inflation of a confinement having specified shape. Furthermore, the inclusion of and the specific type, percent coverage, quantity of elastomer applied to the fabric may depend on the desired shape, size, stretch and placement of the confinement.

What is claimed is:

1. An air bag restraint system for protecting an occupant of a vehicle during a collision comprising:
   a seamless inflatable confinement adapted for attachment to said vehicle and being inflatable upon collision of said vehicle, said confinement being constructed from a seamless fabric comprising braided fibers or yarns; and
   inflating means for inflating said inflatable confinement with a fluid upon the occurrence of a collision;
   wherein said confinement is inflated by said inflating means to a predetermined shape upon a collision, said shape being determined by characteristics of said braided fabric.

2. The apparatus of claim 1 wherein said braided fabric comprises strands of multiple fibers which are interlocked by diagonally crossing a number of said strands such that each strand alternates over and under one or more of said other strands.

3. The apparatus of claim 2 wherein said strands are not parallel to the fabric axis.

4. The apparatus of claim 2 wherein said fabric comprises braided textile yarn.

5. The apparatus of claim 4 wherein said yarn is polyester or nylon.

6. The apparatus of claim 1 further comprising an elastomer coating upon said braided fabric.

7. The apparatus of claim 6 wherein said elastomer coating is chloroprene, silicon, nitrile, acrylic, urethane, butyl or EPDM.

8. The apparatus of claim 6 wherein the elastomer coating is present in a thickness ranging from about 0.5 to 10 mils.

9. The apparatus of claim 1 wherein the braided fabric is sufficiently porous to allow the confinement to deflate after inflation.

10. The apparatus of claim 1 further comprising means for deflating said inflatable confinement.

11. The apparatus of claim 10 wherein said deflating means comprises a plurality of ports in said confinement through which said fluid exits said confinement.

12. The apparatus of claim 10 wherein said deflating means includes a portion wherein said braided fabric has a yarn density which renders said fabric at least semi-porous to allow said fluid to exit therethrough.

13. The apparatus of claim 1 wherein said fluid is a gas.

14. In a passive air restraint device having an air bag inflatable upon a collision, inflating means to inflate said air bag upon said collision and collision detection means to detect a collision of magnitude at least equal to a threshold magnitude, the improvement which comprises a seamless air bag formed from a braided fabric constructed by strands of multiple fibers which are interlocked by diagonally crossing a number of said strands such that each strand alternates over and under one or more said other strands, wherein said strands are not parallel to the axis of said braided fabric, said braided fabric capable of conforming to a predetermined shape and wherein said seamless air bag is deflatable and inflatable to said predetermined shape.

15. The apparatus of claim 14 which further comprises an elastomer coating upon said braided fabric so as to render the fabric either non-porous and essentially non-permeable, or semi-permeable to a fluid used for inflating the air bag.

16. The apparatus of claim 15 wherein said elastomer coating is chloroprene, silicon, nitrile, acrylic, urethane, polyvinyl chloride, butyl or EPDM.

17. The apparatus of claim 16 wherein said elastomer coating is cured by heat, radiation, aerobic or moisture cure mechanisms.

18. The apparatus of claim 16 wherein the thickness of the elastomer coating ranges from 0.5 to 10 mils.

19. The apparatus of claim 14 wherein said fabric is braided polyester or nylon yarn.

20. The apparatus of claim 14 wherein said air bag includes means for deflating same.

21. The apparatus of claim 20 wherein said deflating means include a portion wherein said braided fabric has a yarn density compactness which renders said fabric at least semi-porous.

22. A method for manufacturing an inflatable confinement for use in protecting an occupant of a vehicle during a collision, which method comprises:
   providing a mold having an exterior surface forming a desired shape;

forming a seamless fabric confinement by braiding yarns about said exterior surface of said mold to form a seamless braided fabric structure having said desired shape; and removing said seamless braided fabric structure from said mold to obtain an inflatable confinement capable of being inflated to said desired shape or being deflated to a compact configuration for storage of same.

23. The method of claim 22 wherein said mold is inflatable to form said desired shape.

24. The method of claim 23 which further comprises deflating said inflatable mold so as to facilitate removal of said braided fabric therefrom.

25. The method of claim 22 wherein said forming step comprises interlocking said yarns by diagonally crossing a plurality of said yarns such that each yarn alternates over and under one or more of the other yarns.

26. The method of claim 25 which further comprises selecting said yarns from the group consisting of polyester or nylon textile yarns.

27. The method of claim 22 which further comprises applying an elastomer coating to said structure after forming said desired shape.

28. The method of claim 27 wherein said elastomer coating is chloroprene, acrylic, silicone, nitrile, urethane, PVC, butyl and EPDM, and cured prior to removing said structure from the mold.

29. A method of manufacturing a seamless inflatable confinement for use in passive air bag restraint devices, which method comprises:

inflating an inflatable mold to a predetermined size having an exterior surface of a desired shape;

braiding textile yarns upon said exterior surface of said inflatable mold by diagonally crossing a plurality of said yarns such that each yarn alternates over and under one or more of the other yarns so as to form a seamless braided fabric structure of interlocked yarns in said desired shape;

deflating said inflatable mold; and removing said seamless braided fabric structure from said mold to obtain an inflatable confinement capable of being inflated to said desired shape or being deflated to a compact configuration for storage of same.

30. The method of claim 29 which further comprises selecting said yarns from the group consisting of polyester or nylon.

31. The method of claim 29 which further comprises applying an elastomer coating to said structure after forming said desire shape.

32. The method of claim 31 wherein said elastomer coating is chloroprene, acrylic, silicone, nitrile, urethane, butyl or EPDM, and cured prior to removing said structure from the mold.

* * * * *